United States Patent [19]
Arndt et al.
[11] 3,911,423
[45] Oct. 7, 1975

[54] ELECTRICAL LUMINESCENT DISPLAYS

[75] Inventors: Horst Arndt, Hazeldean; Sayman Fadil Demircioglu, Ottawa, both of Canada

[73] Assignee: Northern Electric Company Limited, Montreal, Canada

[22] Filed: May 8, 1974

[21] Appl. No.: 467,952

[52] U.S. Cl......... 340/324 M; 250/213 R; 307/311; 313/510; 315/153; 340/173 LS; 340/336; 357/19

[51] Int. Cl.$^2$........................................... G08B 5/36

[58] Field of Search........... 340/336, 378 R, 324 M, 340/173 LS; 313/510, 513, 520; 307/311; 357/19; 250/213 R

[56] References Cited

UNITED STATES PATENTS

| | | | |
|---|---|---|---|
| 2,920,232 | 1/1960 | Evans | 340/173 LS |
| 2,958,009 | 10/1960 | Bowerman | 250/213 R |
| 2,975,291 | 3/1961 | Loebner et al. | 340/173 LS |
| 3,479,517 | 11/1969 | Bray et al. | 357/19 |
| 3,623,026 | 11/1971 | Engeler et al. | 340/173 LS |
| 3,673,579 | 6/1972 | Graven | 340/173 LS |
| 3,748,479 | 7/1973 | Lehovec | 357/19 |

*Primary Examiner*—David L. Trafton
*Attorney, Agent, or Firm*—Sidney T. Jelly

[57] ABSTRACT

An electrical luminescent device having a light emitting device and a photoconductive semiconductor between the light emitting device and an electrical supply source. Means are provided for applying a pulse to the photoconductive semiconductor to switch it to a conducting state and switch on the light emitting device. Light from the light emitting device is arranged to impinge on the photoconductive semiconductor to maintain it in a conducting state. The original pulse applied to the photoconductive semiconductor can be an electrical pulse or a light pulse. Typical examples of photoconductive semiconductors are photoresistor networks and field effect transistors.

10 Claims, 12 Drawing Figures

ELECTRICAL LUMINESCENT DISPLAYS

This invention relates to electrical luminescent displays, and in particular to electrogenerated chemical luminescent displays.

Electrogenerated chemical luminescence, or electrogenerated chemiluminescence, hereinafter referred to as EGCL for brevity, is a means of producing light at a low voltage. A device, generally referred to as a cell, usually comprises a sealed chamber containing an EGCL solution in contact with suitable electrodes. The solution usually comprises a luminescor, a solvent for the luminescor, and an electrolyte to ensure that the solution is electrically conducting. Application of a potential causes a redox reaction to take place, with the emission of light.

The electrodes in such cells are formed to a predetermined pattern, depending upon the form of display. Thus, for example, in a sequential display for displaying letters and/or numerals, a series of electrodes are formed, an electrode for each step of a sequence. A further electrode—a transparent electrode formed on the transparent cover of the cell, for example, is common to all the segment electrodes. A suitable logic and device circuit is then prepared to selectively switch on one or more segments to produce the desired display.

The present invention is concerned with the application of semiconductors to provide a self latching device for activation of a light emitting display. Broadly the present invention provides for the use of photoconductive and semiconductor properties of thin film semiconductors to switch on —or connect— predetermined electrodes. The photoconductive semiconductor is actuated to a switched on condition by a pulse of suitable characteristics. This results in the switching on of the light emitting device. Emulsion of light occurs from the light emitting device and some of this light impinges on the photoconductive semiconductor maintaining it in a switched on condition after cessation of the pulse. Further pulsing can be used for actuating the semiconductor device to a switched off condition, or the electrical supply to the light emitting device can be by-passed, switching off the device.

In one past, a thin film field effect transistor is used as the photoconductive semiconductor. An electrical pulse is applied to the thin film field effect transistor, hereinafter referred to as TFT for convenience, so that it is turned on. This initiates light emission. Part of the light emitted from the light emitting device is applied to the TFT making it photoconductive. On cessation of the pulse the light emitting device is still operated as a result of current flowing through the TFT which is maintained in a condition state by the light. A reverse polarity pulse applied to the TFT can be used to switch the light emission off. Alternatively, means, for example a further TFT, can be provided for bypassing, or shunting, the electrical supply to the light emitting device.

In another aspect, photoresistor devices can be used to switch on the light emitting devices. A photoresistor can be switched on by a pulse of light. Again, once the photoresistor is switched, the light emitting device becomes light-emitting and part of this light impinges on the photoresistor maintaining it in conductive state after cessation of the light pulse. The photoresistor can be switched off by an ac pulse of light of a frequency which differs from the first pulse, or means may be provided for by-passing, or shunting, the electrical supply to the light emitting device.

The invention is described in relation to electrogenerated chemical luminescent devices -EGCL devices- but is applicable to any form of light emitting devices, for example light emitting diodes, liquid crystals and incandescent filaments.

The invention will be readily understood by the following description in conjunction with the accompanying drawings, in which.

Figure 1:
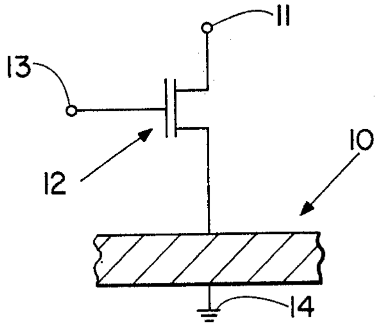
FIG. 1 is a diagrammatic illustration of a basic circuit.
Figure 2:
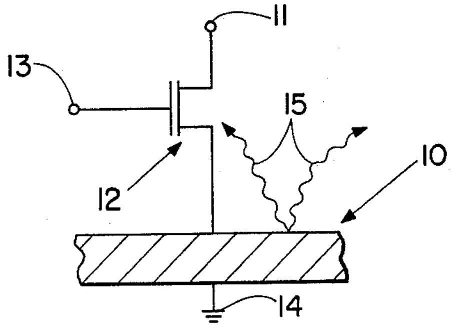
FIG. 2 is similar to FIG. 1 and illustrates a modification thereof to cause latching of light emission.
Figure 3:
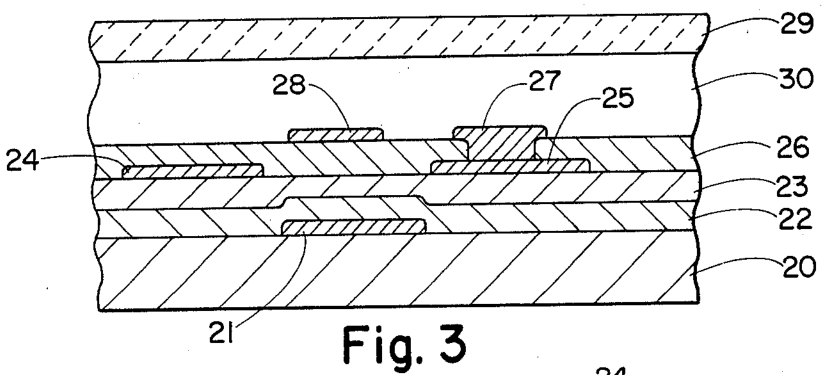
FIG. 3 is a cross-section through one form of EGCL cell embodying the circuit of FIG. 2, on the line III—III of FIG. 4.

FIGS. 1, 2 and 3 illustrate a simple example of the present invention. In FIG. 1 is shown diagrammatically a circuit which includes an EGCL cell indicated at 10, a voltage supply 11, and a thin film transistor, hereinafter referred to as TFT, 12 connected in series between the cell 10 and supply 11. A gate potential is available at 13 and the circuit is completed by a ground connection 14. Application of a gate potential to the TFT turns it on and current is allowed to flow through the EGCL cell 10. Light is emitted. Removal of the gate potential turns off the whole system.

In FIG. 2 the same circuit as in FIG. 1 is shown. However it is arranged that some of the light emitted by the cell 10, indicated by lines 15, is caused to be directed to the source drain area of the TFT 12. This light acting on the source drain area makes the TFT 12 photoconductive. With this arrangement, even when the gate potential is removed from TFT 12, the EGCL remains operating, and emitting, by photocurrent flowing through the TFT. The EGCL cell can be switched off by applying a potential of polarity opposite to that first applied to the gate. This depletes the TFT channel regions of electrons, switches off the TFT -becomes non-conducting- and the supply to the EGCL cell is cut off. The light actuated latch is eliminated and when the reverse polarity potential is removed from the TFT gate the EGCL cell remains off.

FIG. 3 is a cross-section through an EGCL cell and circuit arrangement, illustrating the various parts. The cell is built up on a substrate 20, for example of glass. The gate of the TFT is formed at 21, and is then covered by a transparent layer 22 of $Al_2O_3$. On layer 22 is then formed a semiconducting layer 23 of CdS or CdSe. Source and drain areas of the TFT are formed at 24 and 25 repsectively, and then covered by a transparent layer 26 of $Al_2O_3$. On the layer 26, and extending through an opening in the layer, is the EGCL electrode 27. This electrode 27 is the one at which light emission occurs and is, in plan view, of such a configuration as will produce the particular display desired. Thus for a digital display it will be a segment, for example. In FIG. 3, the EGCL counterelectrode is shown at 28. Alternatively it can be a transparent electrode formed on the inner surface of the transparent cover 29, for example. A space 30 between cover 29 and layer 26 is filled with EGCL solution.

The cell operates, as described above with reference to FIG. 2, by the application of a pulse to the gate 21. This causes the TFT, formed by gate 21, source 24, drain 25 and intervening layers 22, 23 and 26, to become conducting and thus a potential is applied to the EGCL electrode 27. An electrical circuit is completed through the EGCL solution in space 30 to the electrode 28 and back to the current supply source. Light emission occurs at the electrode 27. Some of the light impinges on the semiconductor between the source 24 and drain 25 making the TFT photoconductive. The potential to the gate 21 is then shut off by cessation of the pulse and the TFT transistor remains conducting. To switch light emission a reverse polarity potential is applied to the gate 21 for a short time -until light emission in the cell ceases.

Normally the gate potential is applied as a short pulse. The potential to the EGCL electrodes is alternating and it is usually desirable that the pulse length for the gate potential be equal to at least two or three cycles of the EGCL electrical supply.

Figure 4:
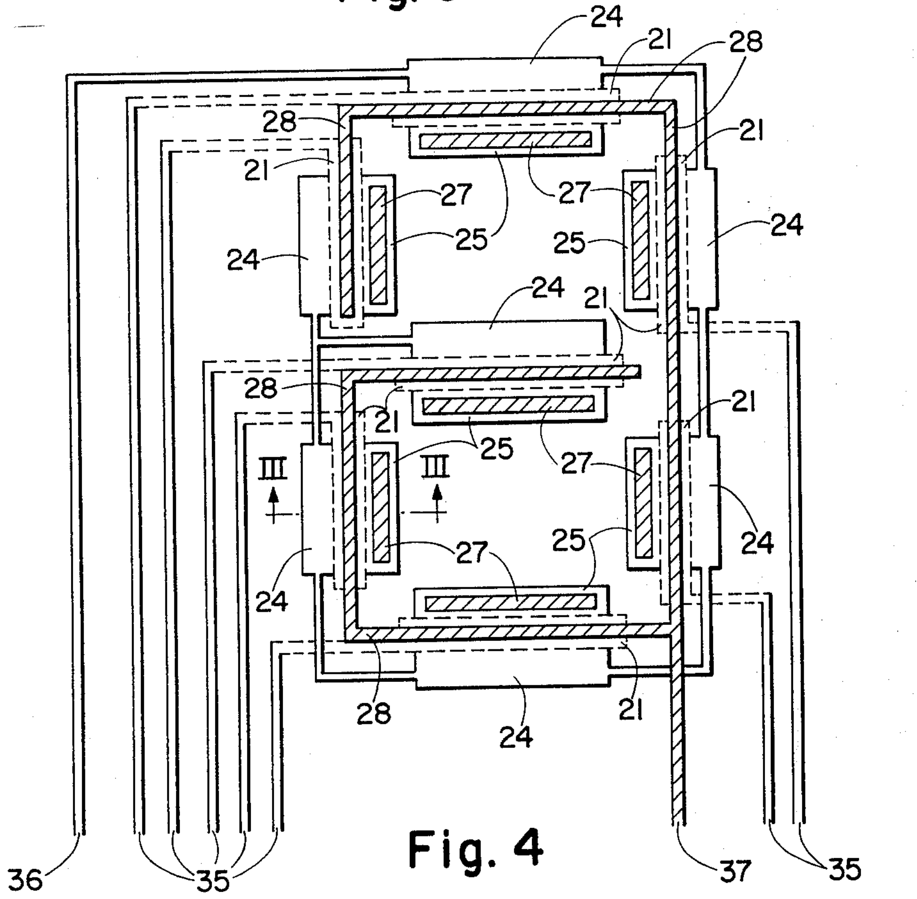
FIG. 4 is a plan view of a seven bar display EGCL cell electrode pattern.

FIG. 4 is a plan view of an EGCL cell embodying the present invention, for a seven digit display. The sources and drains are indicated at 24 and 25 respectively, the EGCL electrodes at which light emission occurs are indicated at 27 and the counterelectrode is indicated at 28. The gate areas 21 are indicated by dotted lines. The leads to the various electrodes are also shown, the gate leads at 35, the potential supply to the sources by lead 36, and the connection to the EGCL counterelectrode by lead 37.

In making an EGCL cell, and its associated circuitry as illustrated in FIGS. 3 and 4, well known techniques for producing the various details, i.e. gate, oxide and semiconductor layers source and drain areas, and other details. The steps in a typical process are as follows:

*a.* deposit gate (21) on substrate (20), the gate, for example, of aluminum vacuum evaporated to a thickness of about .2 microns;

*b.* form oxide layer (22), $Al_2O_3$ by electron beam evaporation or plasma anodization for example, to a thickness of approximately .5 microns;

*c.* form semiconductor layer (23) of cadmium sulphide, vacuum evaporated, to a thickness of approximately .5 to 1.0 microns, (cadmium selinide can also be used);

*d.* form source and drain areas (24 and 25), of aluminum vacuum evaporated for example, to a thickness of about .2 microns;

*e.* form oxide layer (26), as in (*b*) above;

*f.* etch oxide layer to expose part of the drain area 25. This exposed area can form the EGCL electrode or EGCL electrodes 27 are then formed;

*g.* deposit EGCL electrodes (28) typically of platinum;

*h.* encapsulate and fill with EGCL solution.

It will be necessary to carry out the conventional cleaning and rinsing steps as is normal in the various processes. All of the methods briefly described above, i.e., vacuum evaporation, beam evaporation, plasma anodization, etching, depositing platinum, are all very well known and do not require detailed description. Other materials than aluminum can be used for the gate and source and drain, for example gold. Similarly, materials other than platinum can be used for the EGCL electrodes. The thickness of the various layers, electrodes and other items, e.g. gates, sources and drains, can be varied, depending upon the electrical, or electronic, characteristics required.

The particular example illustrated is a seven digit display, as is generally used for a numerical display. The number of segments, or digits, can be varied. Each segment or digit is addressed individually thus requiring seven leads 35, plus two driving leads 36 and 37. Additional digits, or segments will require additional leads 35.

Figure 5:
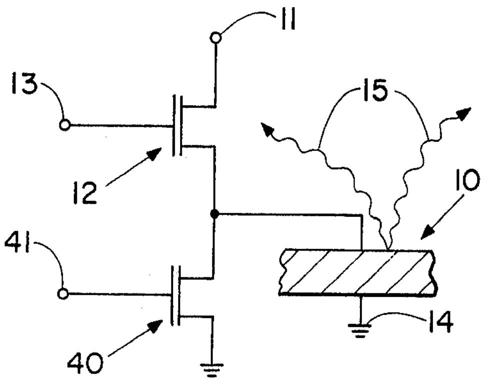
FIG. 5 is a further diagrammatic illustration of another circuit.

As an alternative to applying a negative, or opposite going, pulse to the TFT to switch off —or erase— the emission or diplay, a second TFT can be provided. The second TFT is connected so as to bypass the current flowing to the EGCL (or other device). FIG. 5 illustrates a circuit for such an arrangement and FIG. 6 illustrates the application to an EGCL and can be compared with FIG. 3.

As shown in FIG. 5, an EGCL is indicated at 10, voltage supply at 11, a first TFT at 12 and a gate potential at 13. So far this is as seen in FIG. 1. A second TFT, indicated at 40, is connected in series with the first TFT and in parallel with the EGCL cell 10. The second TFT 40 bypasses the cell 10, and has its own gate potential available at 41. An earth connection 42 is provided for the second TFT 40. The EGCL is switched on by pulsing the first TFT 12 which becomes conductive allowing current to flow to and through the cell. Light is emitted, as indicated at 15 and the first TFT 12 becomes photoconductive and continues to allow current to flow to and through the cell even when the gate potential to the first TFT 12 is removed. When the cell 10 is to be switched off a gate potential pulse is applied via 41 to the second TFT 40. The second TFT becomes conducting and shunts the cell 10 causing the current flowing through the cell to be bypassed to the earth connection 42. The light emission ceases, the first TFT then becomes unlatched and is non-conducting. The gate potential to the second TFT 40 need only be a short pulse, of a duration equal to at least one cycle of the supply current to the EGCL cell 10. Depending upon the decay period of the light emission from the cell, the pulse may need to extend for several cycles of the cell supply current.

Figure 6:
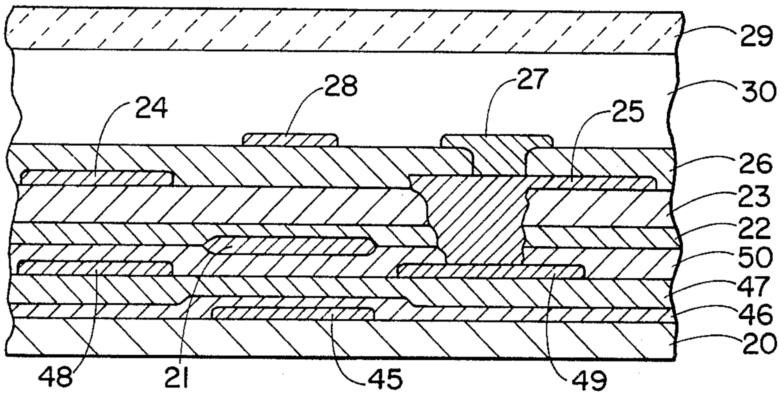
FIG. 6 is a cross-section through an EGCL cell embodying the circuit of FIG. 5.

As seen in FIG. 6, in which electrodes common with FIG. 3 are given the same identifying references, two TFT's are produced in superposed relationship. The first TFT, 12 in FIG. 5, is comprised of gate 21, source 24 and drain 25, transparent oxide layers 22 and 26 and semiconducting layer 23. The EGCL electrode is at 27, in contact with drain 25, and the EGCL counter electrode is at 28. The transparent cover is at 29 with space 30 filled with EGCL solution. The second TFT, 40 in FIG. 5, is formed beneath the first TFT. Thus on the substrate 20 is deposited a gate 45, over which is formed an oxide layer 46, a semiconductor layer 47. Source and drain areas 48 and 49 respectively are formed on the layer 47 and then a further oxide layer 50 is formed. The oxide layer 50 in effect acts as the substrate on which is built the first TFT. A modification is made in that an opening is etched through layers 23, 22 and 50 so that when the drain area 25 of the first -or upper TFT is formed a connection is made with the drain area 49 of the second or lower TFT. The EGCL electrode 27 is also in contact with the drain area 25 of the first TFT.

In operation, the first or upper TFT is pulsed, switching on the EGCL cell. Light is emitted at electrode 27, some of this light falling on the source and drain areas 24 and 25, through the transparent oxide layer 26. This maintains conductivity of the first TFT. To switch off the cell, a pulse is applied to the gate 45 of the second, or lower TFT. This causes the second TFT to become conducting and the current, which normally flows through the first transistor to the electrode 27 of the cell, is shunted from the drain 25 through the drain area 49 bypassing the electrode 27. Light emission ceases and the first or upper TFT becomes non-conducting. The second, or lower TFT is prevented from being made photoconductive by light emission from the electrode 27 by being shielded by the opaque gate 21.

The invention can also be used in conjunction with a matrix display (NxN dot array). In large area displays, accessing of the display points creates a severe problem. To obtain high resolution a large number of lines is required and hence N becomes large. For an $N \times N$ display $N^2$ points are required. If a matrix accessing scheme is used, 2N leads are necessary to access all points. To do that, a logic function must be performed at each light emitting point. This can be accomplished with an AND gate at each point. Such a gate can be provided by forming two TFT's in series. The gate of one TFT is connected to the $x$ line and the gate of the other TFT is connected to the $y$ line. By applying gate potentials to both $x$ and $y$ lines both TFT's are turned on and the EGCL cell activated. By feeding some of the generated light back into the TFT's they can be latched, providing local memory. A basic circuit of such an arrangement is illustated in FIG. 7.

Figure 7:
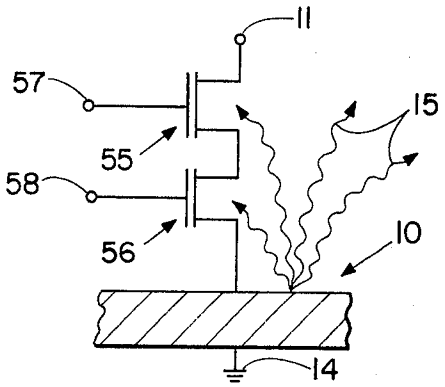
FIG. 7 is another diagrammatic illustration of a further circuit.

In FIG. 7 the EGCL cell is indicated at 10. Two TFT's are indicated at 55 and 56 between the power supply 11 and the cell 10. A gate potential can be applied at 57 to the gate of TFT 55 and also a further gate potential can be applied at 58 to the gate of TFT 56. Once the EGCL cell is switched on it will remain on until one or both TFT's are turned off by applying a depleting gate potential. This would however have the effect of turning off all EGCL cells on a line which had been switched on, if one TFT is switched off and would turn off all EGCL cells on both $x$ and $y$ lines if both TFT's are switched off. This might be an acceptable system, as, if the displayed information is stored in an external memory, any excess erased information can be written back into the display.

Figure 8:
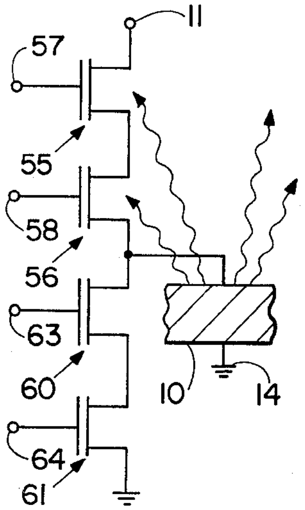
FIG. 8 is yet a further diagrammatic illustration of another circuit.

A more selective erase can be obtained by providing a second AND gate at each point. FIG. 8 illustrates a basic circuit for such an arrangement and FIG. 9 is a cross-section through an EGCL cell embodying circuits as in FIG. 8.

Comparing FIG. 8 with FIG. 7, there is the power supply 11, a first pair of TFT's composed of first and second TFT's 55 and 56 with the respective gate potential termini 57 and 58. The TFT's 55 and 56 are connected in series and are also in series with the EGCL cell 10. A second pair of TFT's 60 and 61 are provided, connected in series, and also in series between the first and second TFT's 55 and 56, and a ground connection 62. The second pair of TFT's 60 and 61 have gate potential termini 63 and 64 respectively. The second pair of TFT's 60 and 61 act as a shunt or bypass for current flowing through the first pair of TFT's 55 and 56 to and through the EGCL cell 10.

The cell is switched on, or activated, by switching on the TFT's 55 and 56. Once the cell is emitting these TFT's are maintained conducting by light from the cell. Thus TFT's 55 and 56 form an ON GATE. To switch the cell off the second pair of TFT's 60 and 61, an OFF gate, are switched on causing the power from the supply 11 flowing through TFT's 55 and 56 to be bypassed to the earth connection 62. This causes light emission to cease and as a result to the TFT's 55 and 56 cease to conduct.

Figure 9:
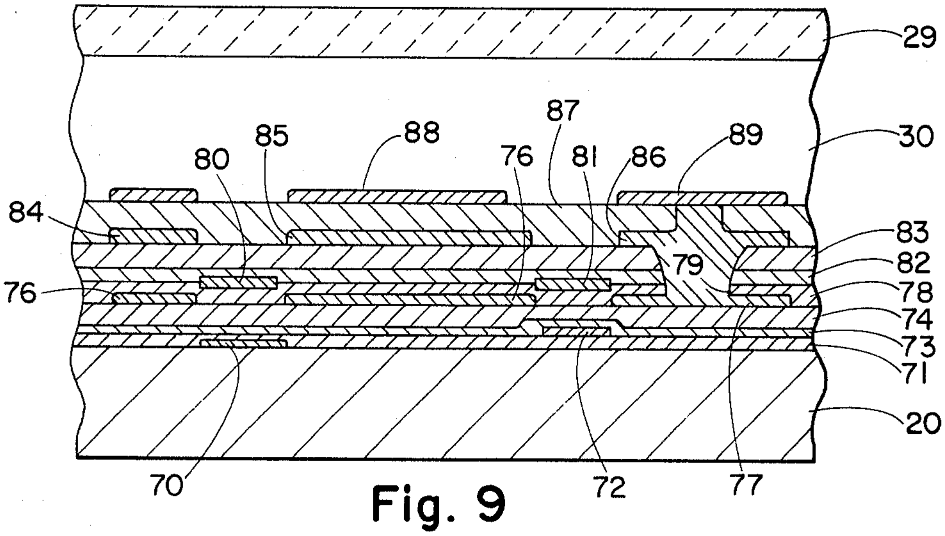
FIG. 9 is a cross-section through an EGCL cell embodying the circuit of FIG. 8.

FIG. 9 is a cross-section similar to that of FIG. 3, and of FIG. 6, and should be compared therewith -particularly with FIG. 3. It illustrates a multilayer structure for the production of the arrangement illustrated diagrammatically in FIG. 8. Effectively there are four layer sequences, corresponding to the four TFT's 55, 56, 60 and 61 of FIG. 8.

Thus, starting with substrate 20, there is then the gate 70, for example for TFT 61, the gate covered by an oxide layer 71. Then follows gate 72, for TFT 60, again covered by an oxide layer 73. A layer of semiconductor material 74 follows. Deposited on the layer 74 is a first source 75 and a drain/source layer 76. Layer 76 acts as a drain at the end nearest to the source 75 and as a source at its other end. A further drain 77 is deposited on the layer 74. The whole is then covered by an oxide layer 78. However a contact window 79 is created to permit contact between the drain 77 and further layers. Thus far the "off" logic, represented by TFT's 60 and 61 has been formed.

Two more gates 80 and 81 are deposited on layer 78, for TFT's 55 and 56. These are covered by oxide layer 82 and then by semiconducting layer 83. Then a first source 84, a drain/source 85 and a further drain 86 are deposited, in effect repeating the construction of the "off" logic. There is applied an oxide layer 87. In all oxide layers 78, 79 and 87 and in the semiconducting material layer 83, direct connection is made to drain 77 from drain 86. Deposited on the oxide layer 87 are the display electrodes 88 and 89, electrode 88 connected through the oxide layer 87 to the drain 86, and thus also to drain 77. The EGCL solution is at 30 and the transparent cover at 29.

In operation, a pulse applied to termini 57 and to 58 switches on the EGCL cell 10 (FIG. 8). Light from the electrode 89 issues from the cell, as indicated at 90, and the TFT's 55 and 56 become photoconductive. The cell will then continue to operate even though the pulse is no longer applied. To switch off the cell, a pulse is applied to termini 63 and 64. This causes the TFT's 60 and 61 to shunt the current flowing through TFT's 55 and 56 to ground 62. The cell ceases to emit light and TFT's 55 and 56 becomes non-conductive.

Figure 10:
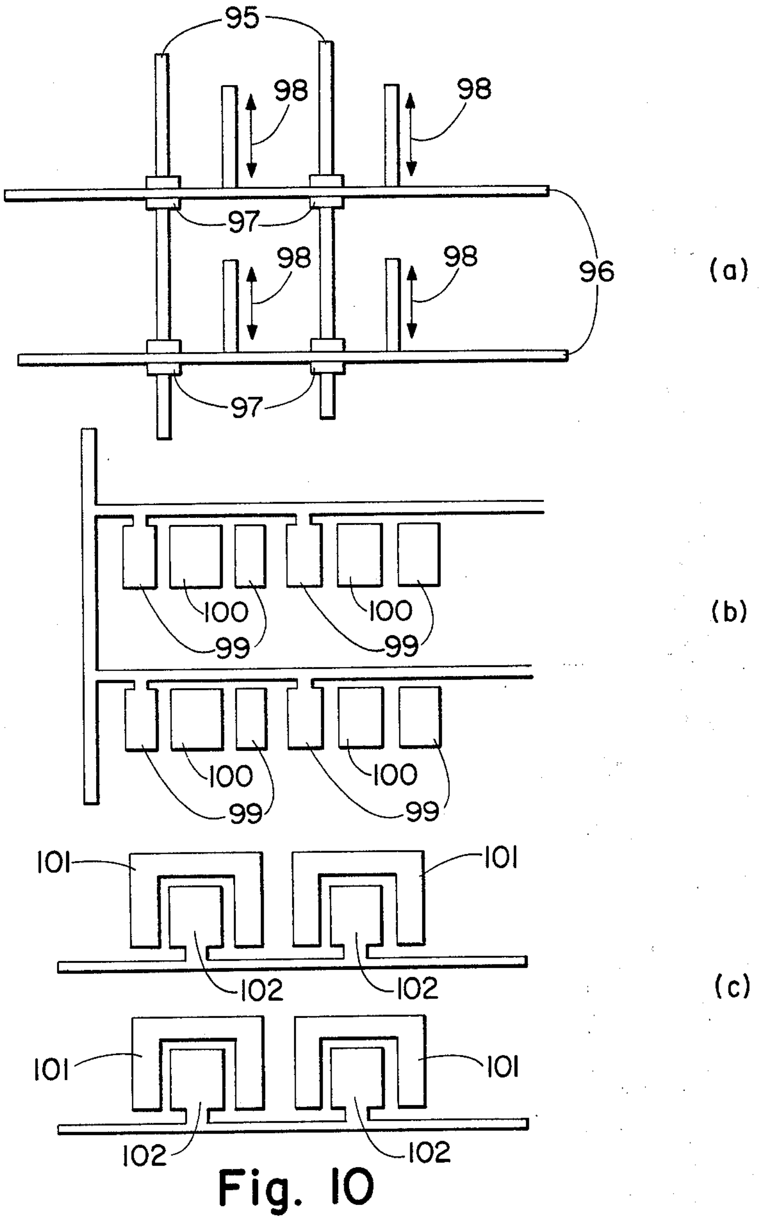
FIG. 10 illustrates a typical mask arrangement for the production of the cell in FIG. 9.

The cross-section of FIG. 9 does not show the electrical connections to the various details, i.e., gates, sources, drains and the electrodes. The masks for the various details, seen in FIG. 10, give an indication as to the pattern of details and conductors. FIG. 10(*a*) is a mask pattern for the gates and shows the *x* leads 95 and *y* leads 96. At the intersection of leads 95 and 96 they are separated by oxide areas 97. Gate areas on the *y* leads extends for the distance 98. In production, the *x* leads and gates would be formed first. A layer of oxide follows, at least at places where the *y* leads cross the *x* leads, and then the *y* leads and associated gates formed. Following oxide layer and semiconductor layer, the first series of sources and drains, indicated at 99 and 100 respectively, are formed using a mask pattern as in FIG. 10(*b*).

After a layer of oxide —layer 78 in FIG. 9, mask patterns of FIG. 10(*a*) are again used to form two more sets of gates *x* and *y*. These would be gates 80 and 81 of FIG. 9. A layer of oxide and a layer of semiconductor material (layer 83 of FIG. 9) and then mask patterns as in FIG. 10(*b*) are again used to form sources and drains -84, 85 and 86 of FIG. 9. A final layer of oxide 87 of FIG. 9, and a mask pattern as in FIG. 10(*c*) is used to form the EGCL electrode 87 and counter electrode 88 the electrode indicated at 101 and the counter electrode at 102 in FIG. 10(*c*).

The invention can also be applied by using a photoresistor network. In such a system two different photoconductive materials are used, each sensitive to a particular colour of light, the colours being different. Such materials are CdS and CdSe for example. They can be used to provide optical write and optical erase for an EGCL display. The photoconductive effect can aso be used to provide an electrical output useful in processing the displayed information.

Figure 11:
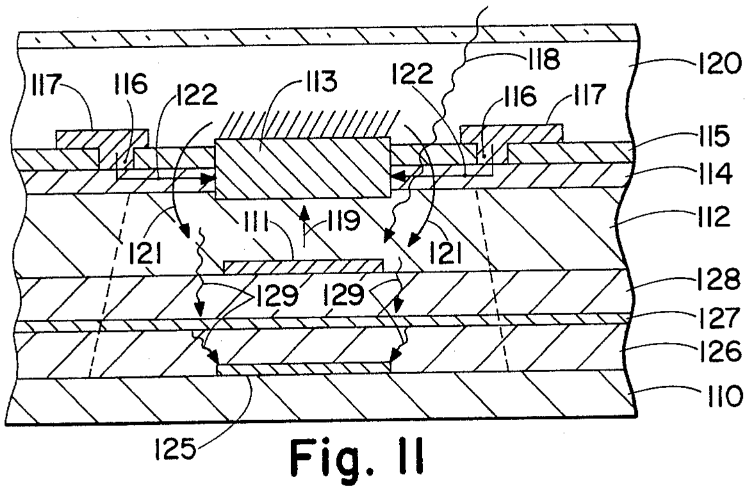
FIG. 11 is a cross-section through a further EGCL cell.

A diagrammatic cross-section through a cell using photoresistors is illustrated in FIG. 11. In FIG. 11 there is a substrate 110, typically of glass or ceramic, on which both the photo-resistor network and a sensing network is formed. Dialing first with the photo-resistor light generating network, this comprises a power line or electrode 111, typically of aluminum, vacuum evaporated to a thickness of approximately .2 microns. Over the electrode 111 is formed a layer of CdSe 112, by vacuum evaporation for example, to a thickness of approximately .5 to 1.0 microns. On layer 112 is formed the electrode 113 for the EGCL cell, typically of platinum. This electrode 113 is formed after two layers 114 and 115 are deposited, of CdS and $Al_2O_3$ respectively. The layer 114 is deposited by vacuum evaporation, to a thickness of approximately .5 microns and layer 115 is deposited by electron beam evaporation, or by plasma anodization for example, to a thickness of about .5 microns. These layers 114 and 115 are then photoetched to form the electrode region and the electrode 113 deposited. Similarly, the oxide layer 115 is photoetched to provide conductive paths 116 for the EGCL counter electrode 117. The electrodes 117, typically of platinum, are formed on the oxide layer 115.

In operation, if the cell is illuminated with a pulse of red light, as per arrow 118, the CdSe layer 112 is photosensitized and current flows from the power line or electrode 111 to the electrode 113 as indicated at 119. From the electrode 113 current will flow through the EGCl solution 120 to electrodes 117, generating light at electrode 113. Feedback of this light, as indicated by arrows 121 will maintain the photosensitivity of the layer 112 and latch the cell on. To erase, or switch off, the cell is illuminated with a pulse green light. This reduces the resistivity of the CdS layer 114 and allows shunting current to flow from the counter electrodes 117 to the electrode 113, as indicated by arrows 122. This turns the cell off.

The sensing function network is formed between the substrate and the photo-resistor/EGCL network described above. X and Y matrices are formed, by depositing the Y sense patterns on the substrate 10, typically of Aluminum, vacuum evaporated, to a thickness of approximately .2 microns, followed by a layer of CdSe 126, vacuum evaporated, to a thickness of approximately .5 microns. Then the X sense pattern 127, again typically of aluminum, is deposited by a further layer of CdSe 128, as for layer 126. When a particular area of the device is lighted, light from the electrode 113 maintains the CdSe layers below it photoconducting, as indicated by arrows 129. Hence information can be read out by scanning the X-Y matrices.

The process steps for forming the details of the device are well known and do not require describing in detail. The normal precleaning and reusing steps will also be carried out as is usual in connection with such processes. The various thicknesses of the various layers, electrodes and other details can be varied, depending upon the electrical characteristics which are required.

Figure 12:
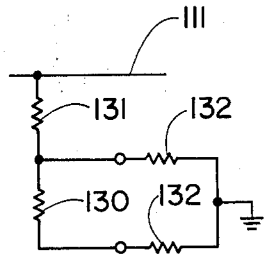
FIG. 12 is a diagrammatic circuit representation of part of the cell of FIG. 11.

FIG. 12 is a diagrammatic circuit of the sensing function network of FIG. 11. The power line or electrode 111 is shown. Resistors 130 and 131 represent the resistances of the layers 126 and 128 respectively. Resistors 132 are the load resistors, the values of which remain constant and should be smaller than the extreme values of resistors 130 and 131. The output signal is the potential difference between $V_x$ and $V_y$.

What is claimed is:

1. An electrical luminescent display, comprising:
a substrate;
a light emitting device on said substrate and having first and second electrode patterns;
an electrical supply terminal;
a photoconductive semiconductor device electrically connected between said terminal and one of said electrode patterns;
means for applying a pulse to said photoconductive semiconductor device to switch said semiconductor device to a conducting state and connect said terminal to said one of electrode patterns for light emission at one of said first and second electrode patterns;
means for impinging light from said light emitting device on said photoconductor semiconducting device to maintain said photoconductor semiconducting device in said conducting state and said light emitting device in light emitting state after cessation of said pulse.

2. An electrical luminescent display, as claimed in claim 1, said photoconductive semiconductor device comprising a photoresistor network, sensitive to light of a first frequency, a pulse of said first frequency switching said network to said conducting state.

3. An electrical luminescent display, as claimed in claim 2, said photoresistor network sensitive also to light of a second frequency, a pulse of said second frequency switching said network to a non-conducting state.

4. An electrical luminescent display, as claimed in claim 1, said photoconductive semiconductor device comprising at least one field effect transistor.

5. An electrical luminescent display, as claimed in claim 1, including means for switching said photoconductive semiconductor device to a non-conducting state and disconnect said terminal from said one of said electrode patterns.

6. An electrical luminescent display, comprising:

a substrate;

a thin film field effect transistor on said substrate and having a source area, a drain and a gate area, said source and drain areas separated by a photoconductive layer;

a light emitting device on said substrate and having first and second electrode patterns, the device electrically insulated from said transistor by a light emitting insulating layer means for connecting an electrical supply to said source area;

means for connecting one of said electrode patterns to said drain area;

means for connecting the other of said electrode patterns to a ground relative of said electrical supply;

means for applying a pulse to said gate area to switch said transistor to a conductive state and connect said supply to one of said electrode patterns for emission at one of said first and second electrode patterns;

means for impinging light from said light emitting device on said photoconductive layer to maintain said transistor in said conductive state and said light emitting device in light emitting state after cessation of said pulse.

7. A display as claimed in claim 6, including means for applying a pulse of a polarity opposite to that of said switching pulse to switch said transistor to a non-conductive state.

8. A display as claimed in claim 6, including a further thin film field effect transistor on said substrate, said further transistor connected between said one of said electrode patterns and said ground, and means for applying a switching pulse to said further transistor to switch said further transistor to a conductive state and bypass said electrical supply from said drain area to said ground, and switch said light emitting device to a non-light emitting state.

9. A display as claimed in claim 6, comprising:

a plurality of light emitting devices arranged in a predetermined pattern, said pattern comprising a number of X axes and also a number of Y axes, a series of light emitting devices along each axis;

a first series of thin film field effect transistors, a transistor connected between each X axis and an electrical supply position;

a second series of thin film field effect transistors, a transistor connected between each Y axis and said electrical supply position;

and means for applying switching pulses to the gate areas of selected transistors on said X and Y axes to connect at least a selected one of said light emitting devices to said electrical supply, for light to be emitted by said device, part of said light arranged to impinge on said related transistors to maintain said transistors in a conductive state.

10. A display as claimed in claim 9, including a third series of thin film effect transistors, a transistor connected between each X axis, and said ground; a fourth series of thin film field effect transistors, a transistor connected between each Y axis and said ground, and means for applying switching pulses to the gate areas of selected transistors on said X and Y axes to connect at least one activated light emitting device to said ground to switch said activated device to a non-light emitting state.

* * * * *